United States Patent Office.

WILLIAM A. McI. VALON, OF RAMSGATE, ASSIGNOR OF ONE-HALF TO THE CONTINENTAL OXYGEN COMPANY, (LIMITED,) OF WESTMINSTER, ENGLAND.

PROCESS OF PURIFYING GAS.

SPECIFICATION forming part of Letters Patent No. 402,787, dated May 7, 1889.

Application filed September 10, 1888. Serial No. 285,069. (No model.) Patented in England May 9, 1888, No. 6,920.

*To all whom it may concern:*

Be it known that I, WILLIAM ANDREW MCINTOSH VALON, civil engineer, a subject of the Queen of Great Britain, residing at the Ramsgate Gas-Works, England, have invented certain Improvements in the Purification of Carbureted-Hydrogen or Coal Gas, (for which I have applied for a patent in Great Britain, No. 6,920, dated 9th day of May, 1888,) of which the following is a specification.

This invention has for its object to effect the purification of carbureted-hydrogen or coal gas in a better or more efficient manner than hitherto, with much less space and plant being necessary to effect the purification, and with economy in time and labor in manipulation.

According to this invention oxygen gas, preferably that which is produced by operating according to Brin's process, as described in the specification of Letters Patent No. 359,424, is passed into or mixed with the gas to be purified, and the oxygen and the gas are then together passed through purifiers containing caustic alkali, preferably lime.

Oxygen is produced, according to the Brin process, by first removing the moisture and carbonic acid from atmospheric air, then forcing the air through tanks containing heated oxide of barium, which absorbs the oxygen, allowing the nitrogen to pass, and finally withdrawing the oxygen from the barium by suction. I do not, of course, limit myself to this mode of obtaining the oxygen used in my process.

The proportion of oxygen gas employed will vary according to the amount of impurities in the gas; but, generally, for every one hundred grains of sulphur present in each one hundred cubic feet of the impure gas one part, by volume, of the oxygen gas will be used for every one thousand parts, by volume, of the gas to be purified. The reactions which take place are, I believe, as follows: The calcium hydrate (supposing for the purpose of this example that lime is the alkali used) takes up the sulphureted hydrogen from the impure gas and forms a sulphide of the alkali used, (in this case calcium sulphide,) which in its turn acts upon the sulphur compounds other than sulphureted hydrogen. The sulphide and other sulphur derivatives of the alkali (in this case calcium sulphide, &c.) are reoxidized by the oxygen which has been passed into or mixed with the gas according to this invention, and are in great part revivified by being retransformed into the hydrate of the alkali, (in this case calcium hydrate,) the sulphur being in great part separated as free sulphur. This hydrate of the alkali (in this case calcium hydrate) is also capable of absorbing the carbonic anhydride with formation of a carbonate of the alkali employed, as in the usual method of purification by lime. The aforesaid actions take place practically simultaneously.

The complete saturation of the purifying material by the foregoing impurities is readily indicated by carbonic anhydride being detected at the outlet of the purifier in quantity equal to that in which it is present at the inlet, and when this is found to be the case the purifier should be put out of action, as the purifying power of the alkali is then exhausted.

The exhausted material in the purifier consists, mainly, of carbonate of the alkali employed, free sulphur, and sulphur derivatives of the alkali employed. The sulphur may be recovered and the lime or other alkali be recausticized by the usual or any suitable method.

By the process according to this invention both sulphureted hydrogen or other sulphur compounds and carbonic anhydride may by one operation be completely or almost completely removed from the impure gas.

The use of oxide of iron may be dispensed with when purifying the gas according to this invention, and consequently the space and plant necessary for effecting the purification of the gas may be materially reduced. A less quantity of lime is also required than is required in purification as hitherto conducted, and the exhausted material from the purifier has no unpleasant odor, or but little such odor, and beyond these advantages the process according to this invention presents the great additional advantage that the illuminating power of the gas is increased by the process of purification instead of its being decreased, as is the case when the purification is carried on by the use of atmospheric air, as has hitherto been done. This is due, I believe, to the fact that nitrogen is not present in any appreciable quantity when I use oxygen according to my invention, the nitrogen present in the air employed in the processes mentioned having the effect of decreasing the illuminating power of the gas.
I wish it to be understood that I do not claim the use of atmospheric air.

It is to be observed as of the utmost importance in carrying out my invention that the oxygen is brought into contact with the gas after the ammonia and tarry matters have been withdrawn by the usual means, and the gas contains as impurities only the carbonic anhydride, sulphureted hydrogen, and other sulphur compounds, as hereinbefore set forth;
otherwise the reactions specified cannot take place, and the results indicated cannot be produced. I am aware that it has been proposed heretofore to inject pure oxygen into crude gas coming from the retorts, and then pass the same through lime, producing what has been called "lime charged with hyposulphite of ammonia." Such process is not practicable as a mode of purifying gas, and is essentially different from my process in the reactions that take place and in the results produced. The resultant material after treating crude gas as above specified is unmarketable, and, having the offensive smell of "blue billy" and the suffocating odor of ammonia, can be handled with great difficulty, and then only after a greater part of the ammonia is dispersed. By such treatment, moreover, the sulphate of ammonia (one of the most valuable by-products in the distillation of coal) and a considerable part of the tar are lost. For these reasons I wish it to be understood that I do not claim, broadly, the treatment of coal-gas by adding oxygen thereto and passing the mixture through lime, and I particularly disclaim the treatment of crude gas coming from the retorts with oxygen and then passing through lime; but What I do claim, and desire to secure by Letters Patent, is—

The process of purifying carbureted-hydrogen or coal gas containing carbonic anhydrides, sulphureted hydrogen, or other sulphur compounds, after removal of the ammonia and tarry matters, by mixing oxygen with such gas, and then passing the mixture through a caustic alkali, whereby the carbonic anhydrides and sulphur compounds are removed, substantially as described.

In testimony whereof I have signed my name to this specification in the presence of two subscribing witnesses.

W. A. McI. VALON.

Witnesses:
 HENRY HOUSEMAN,
 *Solicitor, 3 Princes Street, Storey's Gate, Westminster.*
 HENRY JOHN FEASEY,
  *Of the same place, his clerk.*